US008265386B2

(12) United States Patent
Kasahara

(10) Patent No.: US 8,265,386 B2
(45) Date of Patent: Sep. 11, 2012

(54) IMAGING APPARATUS

(75) Inventor: Ryosuke Kasahara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 748 days.

(21) Appl. No.: 12/382,278

(22) Filed: Mar. 12, 2009

(65) Prior Publication Data
US 2009/0238455 A1 Sep. 24, 2009

(30) Foreign Application Priority Data

Mar. 18, 2008 (JP) ................................ 2008-069506

(51) Int. Cl.
G06K 9/00 (2006.01)
(52) U.S. Cl. .......................... 382/167; 382/260; 382/275
(58) Field of Classification Search .................. None
See application file for complete search history.

(56) References Cited

U.S. PATENT DOCUMENTS

| 5,515,122 | A  | * | 5/1996  | Morishima et al. | 353/98 |
| 5,745,176 | A  | * | 4/1998  | Lebens | 348/370 |
| 6,922,267 | B2 | * | 7/2005  | Endo et al. | 359/15 |
| 2003/0031375 | A1 | * | 2/2003 | Enomoto | 382/255 |
| 2004/0150732 | A1 | * | 8/2004 | Yamanaka | 348/272 |
| 2004/0165200 | A1 | * | 8/2004 | Nabeshima | 358/1.9 |
| 2005/0168614 | A1 | * | 8/2005 | Okada et al. | 348/335 |
| 2007/0035646 | A1 | * | 2/2007 | Mihara et al. | 348/272 |
| 2007/0103564 | A1 | * | 5/2007 | Chiba | 348/223.1 |
| 2008/0007630 | A1 | * | 1/2008 | Hara | 348/223.1 |
| 2009/0207271 | A1 | * | 8/2009 | Utsugi et al. | 348/223.1 |
| 2009/0304277 | A1 | * | 12/2009 | Murata | 382/167 |

FOREIGN PATENT DOCUMENTS

| EP | 1 855 486 | 11/2004 |
| EP | 1 592 233 | 11/2005 |
| EP | 1 855 486 | 11/2007 |
| JP | 02-205187 | 8/1990 |
| JP | 2006-345053 | 12/2006 |
| JP | 2006-345054 | 12/2006 |
| JP | 2006-345055 | 12/2006 |
| JP | 2006-345056 | 12/2006 |

OTHER PUBLICATIONS

Helmy A. Eltoukhy and Sam Kavusi, "A Computationally Efficient Algorithm for Multi-Focus Image Reconstruction", 2003, Proc. of SPIE Electronic Imaging.*
V. Kaufmann and R. Ladstadter, "Elimination of Color Fringes in Digital Photographs Caused by Lateral Chromatic Aberration", Oct. 2005, CIPA 2005 XX International Symposium, Torino, Italy.*
European Search Report dated Jan. 24, 2011 issued in corresponding European Application No. 09250682.3.
Japanese Office Action dated Dec. 21, 2011 issued in corresponding Japanese Application No. JP 2008-069506.

* cited by examiner

Primary Examiner — Jason M Repko
Assistant Examiner — Siamak Harandi
(74) Attorney, Agent, or Firm — Harness, Dickey & Pierce, P.L.C.

(57) ABSTRACT

A disclosed imaging apparatus includes a wide-angle optical system having at least chromatic aberration of magnification; an imaging device including color filters and configured to receive an optical image from the optical system via the color filters and to convert the optical image into image data; and a chromatic aberration of magnification correcting unit configured to convert coordinates of the image data and thereby correct chromatic aberration of magnification of the image data. The chromatic aberration of magnification correcting unit is configured to convert the image data into different-wavelength image data having wavelength bands different from original wavelength bands of the color filters before correcting the chromatic aberration of magnification.

13 Claims, 21 Drawing Sheets

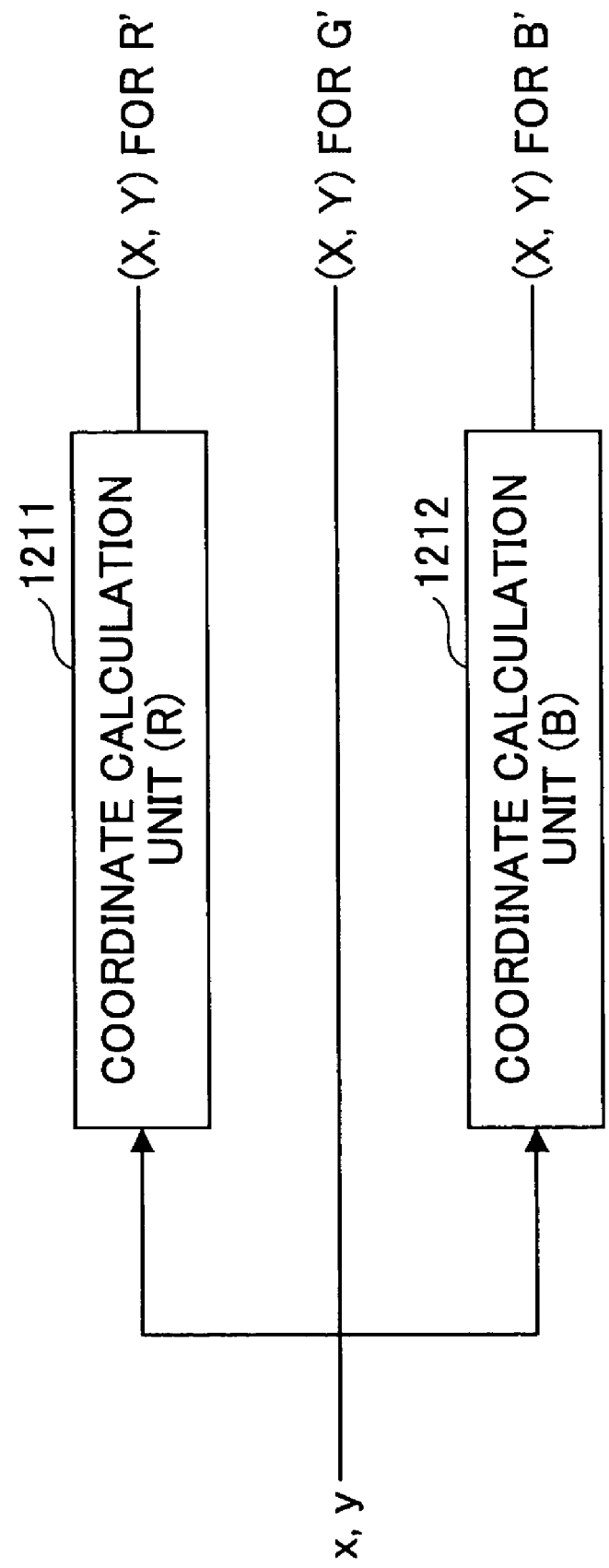

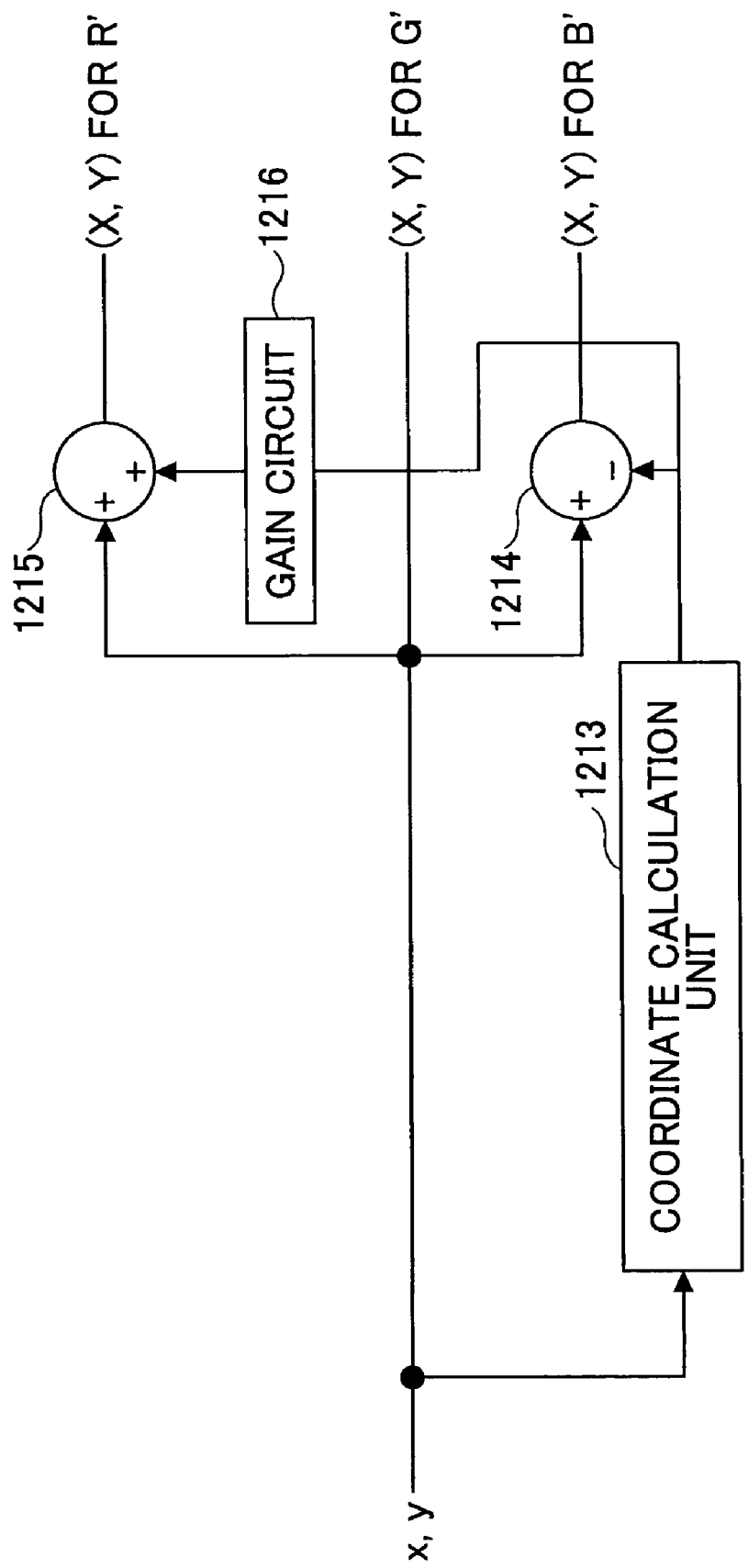

FIG.13
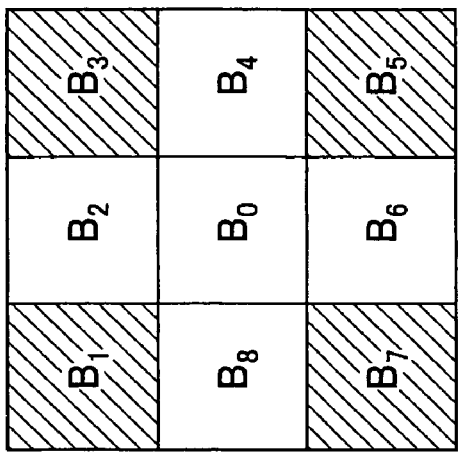
(c) B SIGNAL
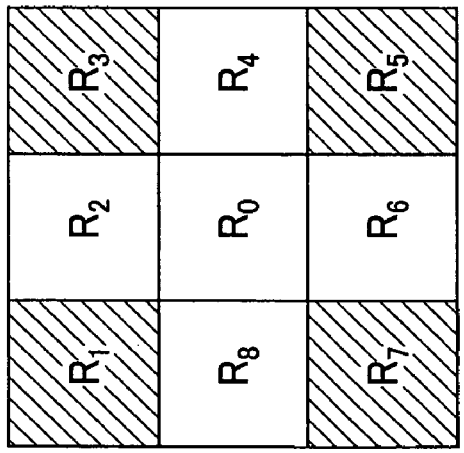
(b) R SIGNAL
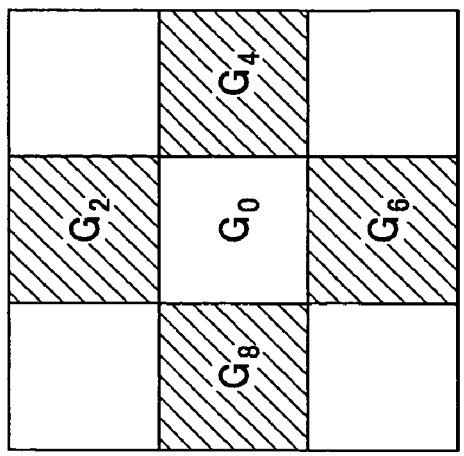
(a) G SIGNAL

FIG.15

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

FIR FILTER

ORIGINAL POSITION
OF BLACK DOT

AFTER CHROMATIC ABERRATION
OF MAGNIFICATION IS CORRECTED
(R+G+B)

IMAGING APPARATUS

BACKGROUND OF THE INVENTION

1. Field of the Invention

A certain aspect of the present invention relates to an imaging apparatus.

2. Description of the Related Art

There is an increasing demand for wide-angle imaging apparatuses for applications such as rearview monitors of vehicles. As the angle of view increases, chromatic aberration of magnification and distortion of an optical system increase and it becomes increasingly difficult to design an optical system with small aberration. Therefore, to improve image quality of a wide-angle imaging apparatus, it is necessary to employ image processing. For example, patent document 1 discloses methods for correcting aberration of an image in an imaging apparatus that uses an optical system having chromatic aberration of magnification and distortion. In a method disclosed in patent document 1, coordinate transformation is performed separately on each of R (red), G (green), and B (blue) signals (RGB color components) obtained by an imaging device such as a charge-coupled device (CCD) or a CMOS sensor to correct chromatic aberration of magnification and distortion at the same time. In another method disclosed in patent document 1, chromatic aberration of magnification is ignored and coordinate transformation is performed collectively on the RGB color components to correct only the distortion.

[Patent document 1] Japanese Patent Application Publication No. 2006-345054

Generally, an imaging device includes color filters such as a Bayer color filter array. In the periphery of an image where the chromatic aberration of magnification is large, because of broad spectral characteristics of the color filters, the optical point spread function (PSF) of each color component tends to increase and the resolution (modulation transfer function: MTF) tends to decrease even if coordinate transformation is performed to correct the chromatic aberration of magnification. For example, when an image of an object is captured via an optical system having chromatic aberration of magnification by an imaging device with color filters having spectral characteristics as shown by FIG. 17, the PSF of each of the RGB color components in the periphery of the image increases as shown in FIG. 18 (each cell indicates a pixel) because of the chromatic aberration of magnification and as a result, the MTF decreases. For this reason, as shown in FIG. 19, a blur is seen around the original position of a black dot and the resolution (MTF) is still low even after the chromatic aberration of magnification is corrected by performing coordinate transformation on each color component.

SUMMARY OF THE INVENTION

An aspect of the present invention provides an imaging apparatus that solves or reduces one or more problems caused by the limitations and disadvantages of the related art.

According to an aspect of the present invention, an imaging apparatus includes a wide-angle optical system having at least chromatic aberration of magnification; an imaging device including color filters and configured to receive an optical image from the optical system via the color filters and to convert the optical image into image data; and a chromatic aberration of magnification correcting unit configured to convert coordinates of the image data and thereby correct chromatic aberration of magnification of the image data. The chromatic aberration of magnification correcting unit is configured to convert the image data into different-wavelength image data having wavelength bands different from original wavelength bands of the color filters before correcting the chromatic aberration of magnification.

BRIEF DESCRIPTION OF THE DRAWINGS

FIGS. 11A through 11C are drawings illustrating exemplary configurations of a target coordinate calculation unit shown in FIG. 10;

FIG. 13 is a drawing illustrating a Bayer color filter array;

FIG. 15 is a drawing illustrating an exemplary FIR filter;

DESCRIPTION OF THE PREFERRED EMBODIMENTS

Preferred embodiments of the present invention are described below with reference to the accompanying drawings.

First, a chromatic-aberration-of-magnification correcting unit of an imaging apparatus according to an embodiment of the present invention is described.

Figure 1:
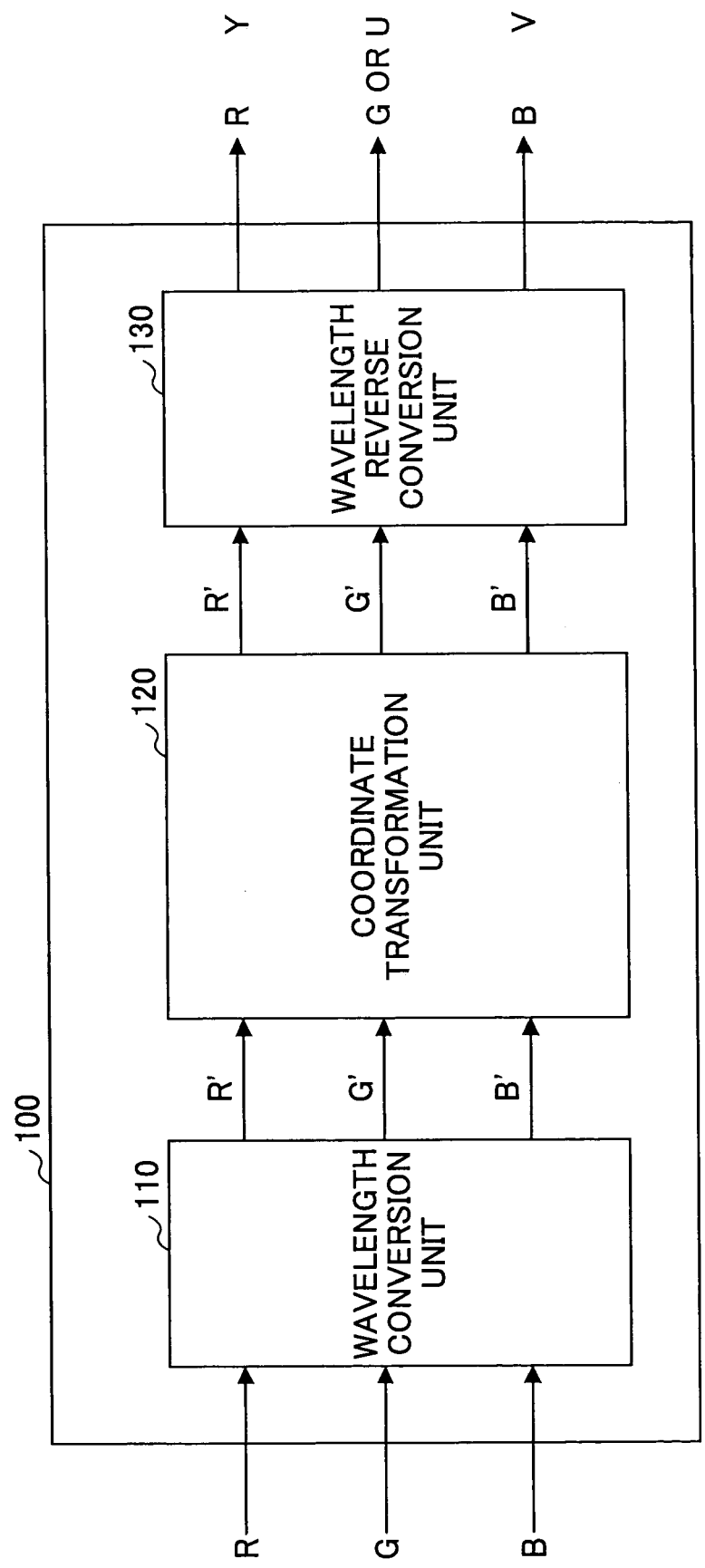
FIG. 1 is a drawing illustrating a chromatic-aberration-of-magnification correcting unit according to a first embodiment of the present invention.

FIG. 1 is a drawing illustrating a chromatic-aberration-of-magnification correcting unit 100 according to a first embodiment of the present invention. The chromatic-aberration-of-magnification correcting unit 100 includes a wavelength conversion unit 110 that converts RGB image data obtained by an imaging device into R'G'B' data having wavelength bands different from those of color filters of the imaging device (e.g., wavelength bands narrower than those of the color filters), a coordinate transformation unit 120 that performs coordinate transformation separately on each of the R', G', and B' data components to correct the chromatic aberration of magnification, and a wavelength reverse conversion unit 130 that converts the chromatic-aberration-of-magnification-corrected R'G'B' data into RGB or YUV image data having original wavelength bands of the color filters of the imaging device. The coordinate transformation unit 120 is described later in more detail.

Calculations performed by the wavelength conversion unit 110 and the wavelength reverse conversion unit 130 are represented by the following formulas (1):

$$\begin{cases} X = e(1)*A + e(2)*B + e(3)*C \\ Y = e(4)*A + e(5)*B + e(6)*C \\ Z = e(7)*A + e(8)*B + e(9)*C \end{cases} \quad (1)$$

In formulas (1), A, B, and C indicate inputs; X, Y, and Z indicate outputs; and e(1) through e(9) indicate coefficients. In the case of the wavelength conversion unit 110, A, B, and C correspond to R, G, and B; and X, Y, and Z correspond to R', G', and B'. In the case of the wavelength reverse conversion unit 130, A, B, and C correspond to R', G', and B'; and X, Y, and Z correspond to R, G, and B or Y, U, and V. The wavelength conversion unit 110 and the wavelength reverse conversion unit 130 perform similar calculations except that the values of coefficients e(1) through e(9) are different. Thus, the wavelength conversion unit 110 and the wavelength reverse conversion unit 130 perform color space conversion.

Figure 2:
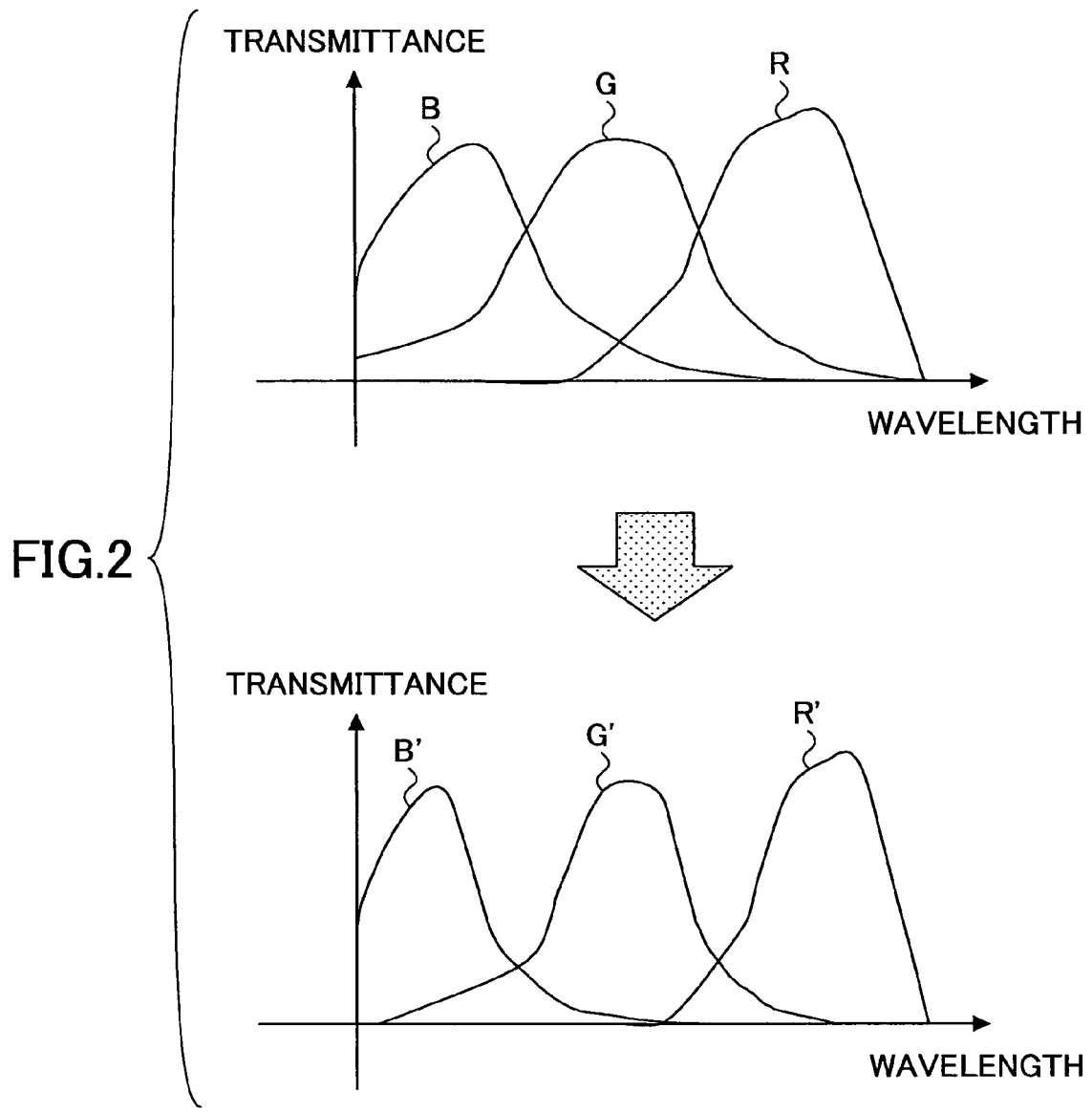
FIG. 2 is a drawing illustrating exemplary wavelength conversion according to the first embodiment.
Figure 3:
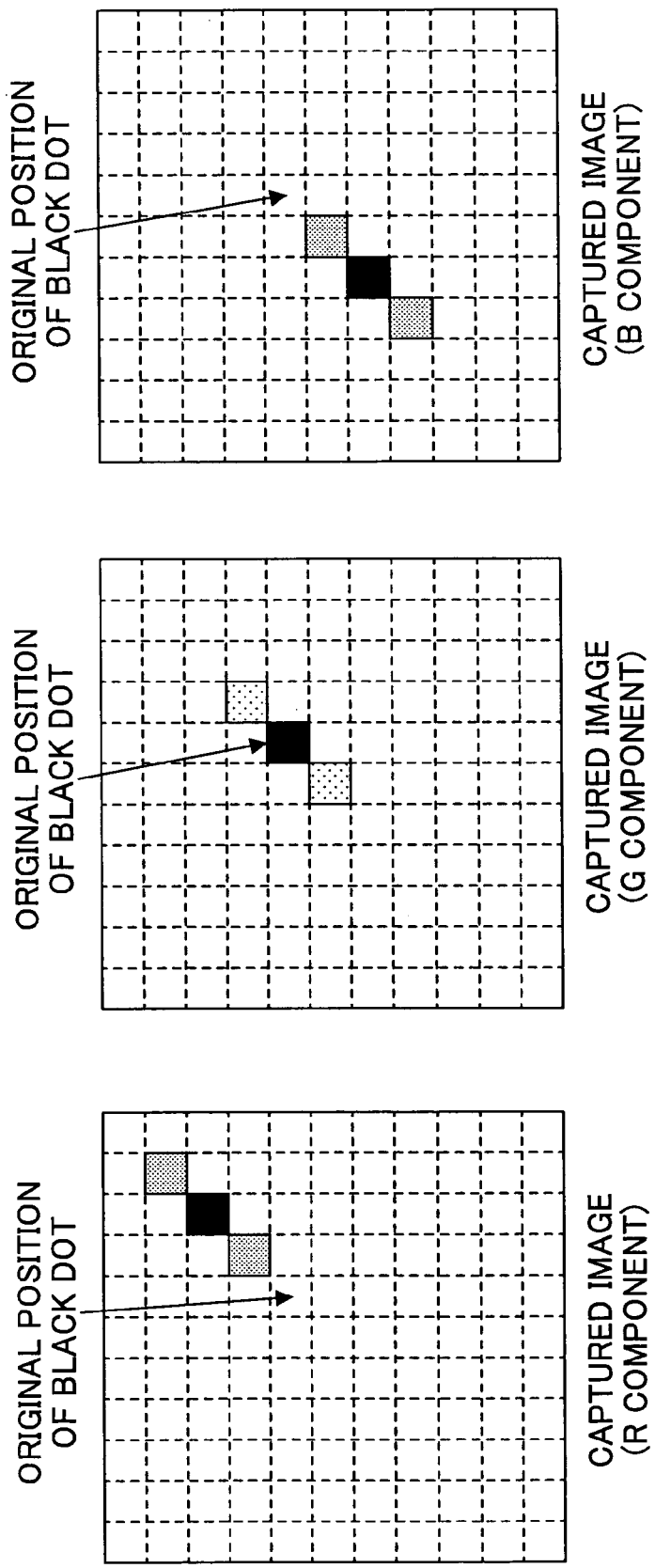
FIG. 3 is a drawing showing a relationship between wavelength conversion and chromatic aberration of magnification.
Figure 4:
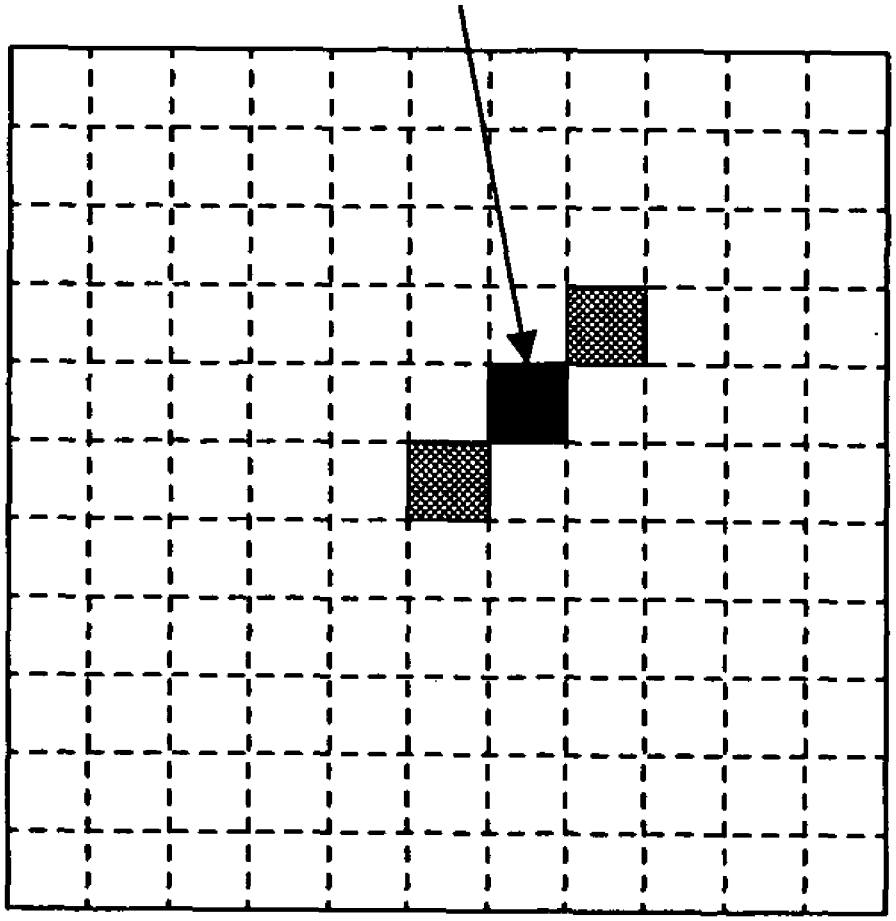
FIG. 4 is a drawing illustrating an image after chromatic aberration of magnification is corrected.
Figure 18:
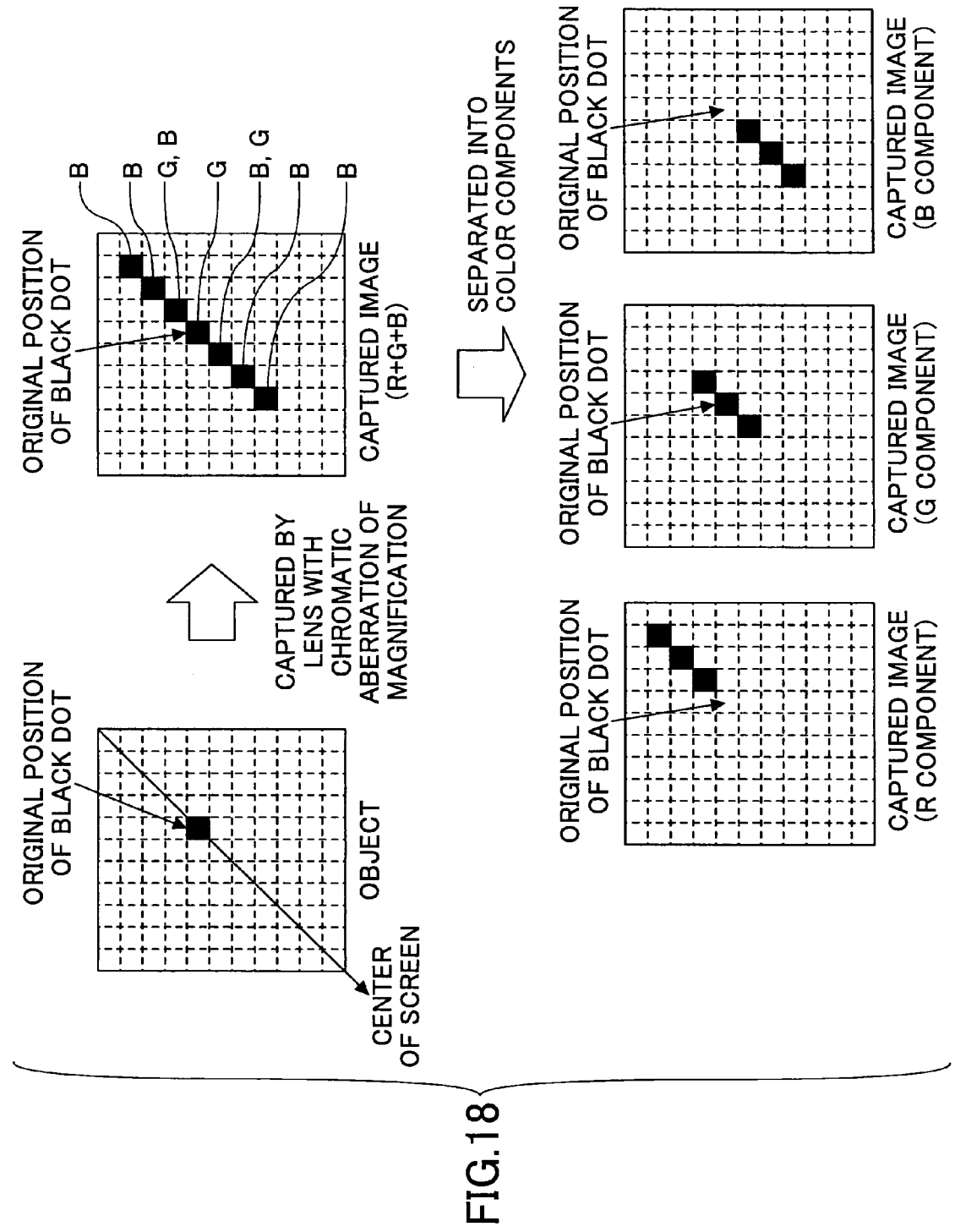
FIG. 18 is a drawing showing a relationship between color filters and chromatic aberration of magnification.
Figure 19:
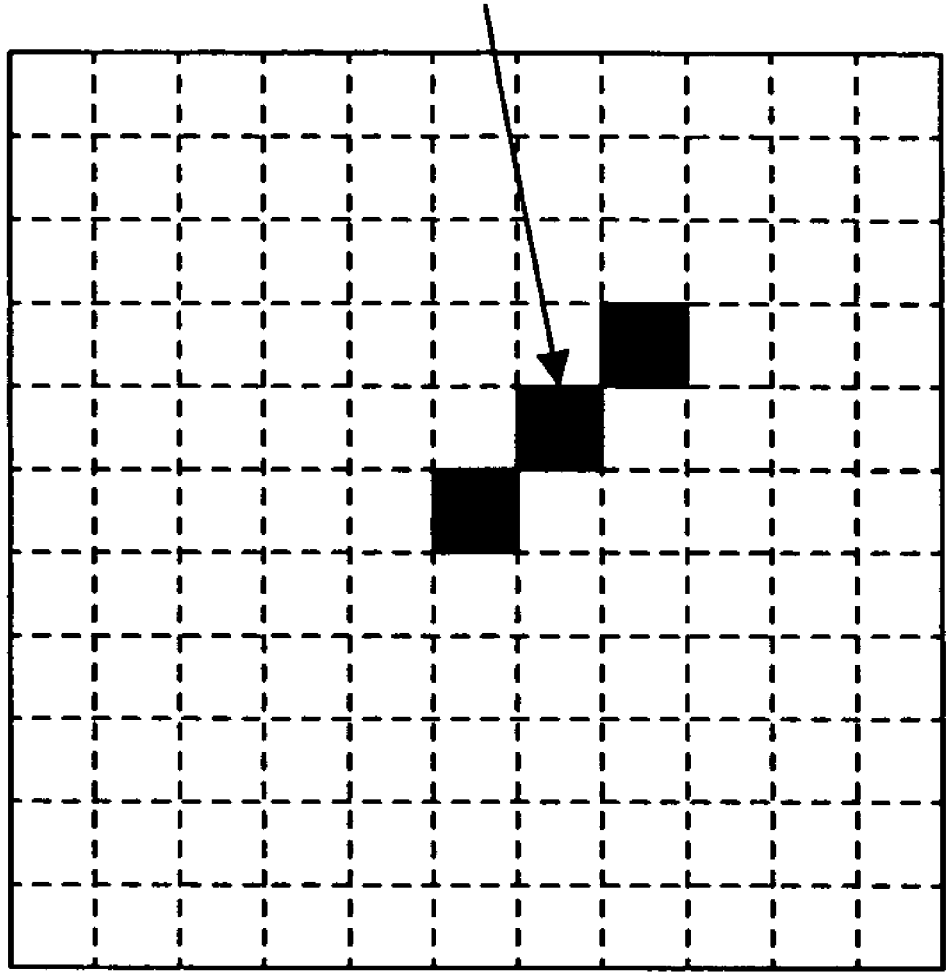
FIG. 19 is a drawing showing an image after chromatic aberration of magnification is corrected according to the related art.

The wavelength conversion unit 110 performs calculations according to formulas (1) to equivalently change the spectral characteristics of the color filters of the imaging device such that the transmission range of each color becomes smaller as shown in FIG. 2. As a result, as shown in FIG. 3, the spread of each color becomes smaller compared with the example shown in FIG. 18. FIG. 4 shows an image after the chromatic aberration of magnification is corrected. Compared with the example shown in FIG. 19, the blur of the image is reduced and the resolution is improved.

Shown below are formulas (2) obtained by rewriting formulas (1) for the wavelength conversion unit 110 and exemplary values of coefficients e(1) through e(9) for the wavelength conversion unit 110.

$$\begin{cases} R' = e(1)*R + e(2)*G + e(3)*B \\ G' = e(4)*R + e(5)*G + e(6)*B \\ B' = e(7)*R + e(8)*G + e(9)*B \end{cases} \quad (2)$$

$e(1) = 1;$ $e(2) = -0.10;$ $e(3) = 0;$ $e(4) = -0.30;$ $e(5) = 1;$ $e(6) = -0.10;$ $e(7) = 0;$ $e(8) = -0.20;$ $e(9) = 1;$

After the chromatic aberration of magnification is corrected by the coordinate transformation unit 120, the R'G'B' data may be output without conversion to a downstream processing component of the imaging apparatus. However, in this case, the spectral characteristics of the R'G'B' data are different from the spectral characteristics of human eyes and it is difficult to reproduce the hues of the image. Therefore, as shown in FIG. 1, it is preferable to convert the R'G'B' data, by the wavelength reverse conversion unit. 130, into RGB or YUV data having original spectral characteristics of the color filters or spectral characteristics close to the characteristics of human eyes.

Shown below are formulas (3) obtained by rewriting formulas (1) for the wavelength reverse conversion unit 130 and exemplary values of coefficients e(1) through e(9) for the wavelength reverse conversion unit 130. Formulas (3) are used to convert the R'G'B' data into RGB data having the original spectral characteristics of the color filters after the chromatic aberration of magnification is corrected. The values of coefficients for the wavelength reverse conversion unit 130 are obtained by inverting signs of the values of the corresponding coefficients other than e(1), e(5), and e(9) used for the wavelength conversion unit 110 shown above.

$$\begin{cases} R = e(1)*R' + e(2)*G' + e(3)*B' \\ G = e(4)*R' + e(5)*G' + e(6)*B' \\ B = e(7)*R' + e(8)*G' + e(9)*B' \end{cases} \quad (3)$$

$e(1) = 1;$ $e(2) = 0.10;$ $e(3) = 0;$ $e(4) = 0.30;$ $e(5) = 1;$ $e(6) = 0.10;$ $e(7) = 0;$ $e(8) = 0.20;$ $e(9) = 1;$

The configuration of FIG. 1 makes it possible to improve the resolution of an image (to improve the contrast in the periphery of an image) compared with a case where the chromatic aberration of magnification of RGB image data is simply corrected.

Meanwhile, when one of the RGB color components output from the RGB sensor is saturated, it is difficult to accurately perform color space conversion, and therefore correcting the chromatic aberration of magnification may adversely affect the image quality. Therefore, it is preferable not to correct the chromatic aberration of magnification (not to convert the coordinates) of saturated pixels output from the sensor. Also, the chromatic-aberration-of-magnification correcting unit 100 may be configured not to convert saturated pixels into data having wavelength bands different from those of the color filters of the imaging device.

Further, to reduce processing workload, the wavelength conversion unit 110 and the wavelength reverse conversion unit 130 may be configured not to perform color space conversion as described above for a central portion of the screen where chromatic aberration of magnification is not present. In other words, the chromatic-aberration-of-magnification correcting unit 100 may be configured to convert only a portion of image data corresponding to a peripheral part of the image into data having wavelength bands different from those of the color filters.

Figure 5:
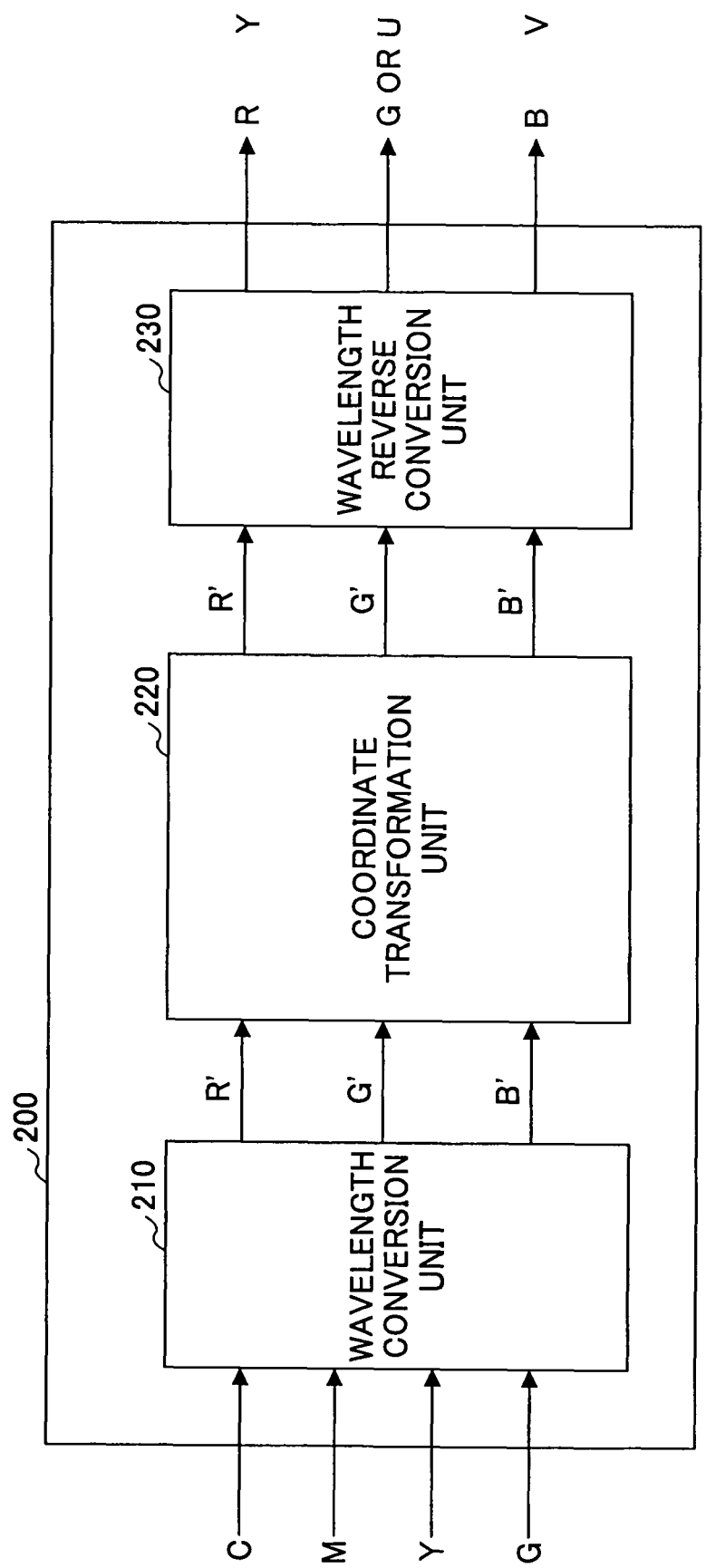
FIG. 5 is a drawing illustrating a chromatic-aberration-of-magnification correcting unit according to a second embodiment of the present invention.

FIG. 5 is a drawing illustrating a chromatic-aberration-of-magnification correcting unit 200 according to a second embodiment of the present invention. Similar to FIG. 1, the chromatic-aberration-of-magnification correcting unit 200 includes a wavelength conversion unit 210, a coordinate transformation unit 220, and a wavelength reverse conversion unit 230. In this embodiment, it is assumed that complementary color filters are used for an imaging device. The wavelength conversion unit 210 performs color space conversion on CMYG complementary color image data and outputs R'G'B' image data. The coordinate transformation unit 220 and the wavelength reverse conversion unit 230 have substantially the same functions as those of the corresponding units shown in FIG. 1.

Figure 6:
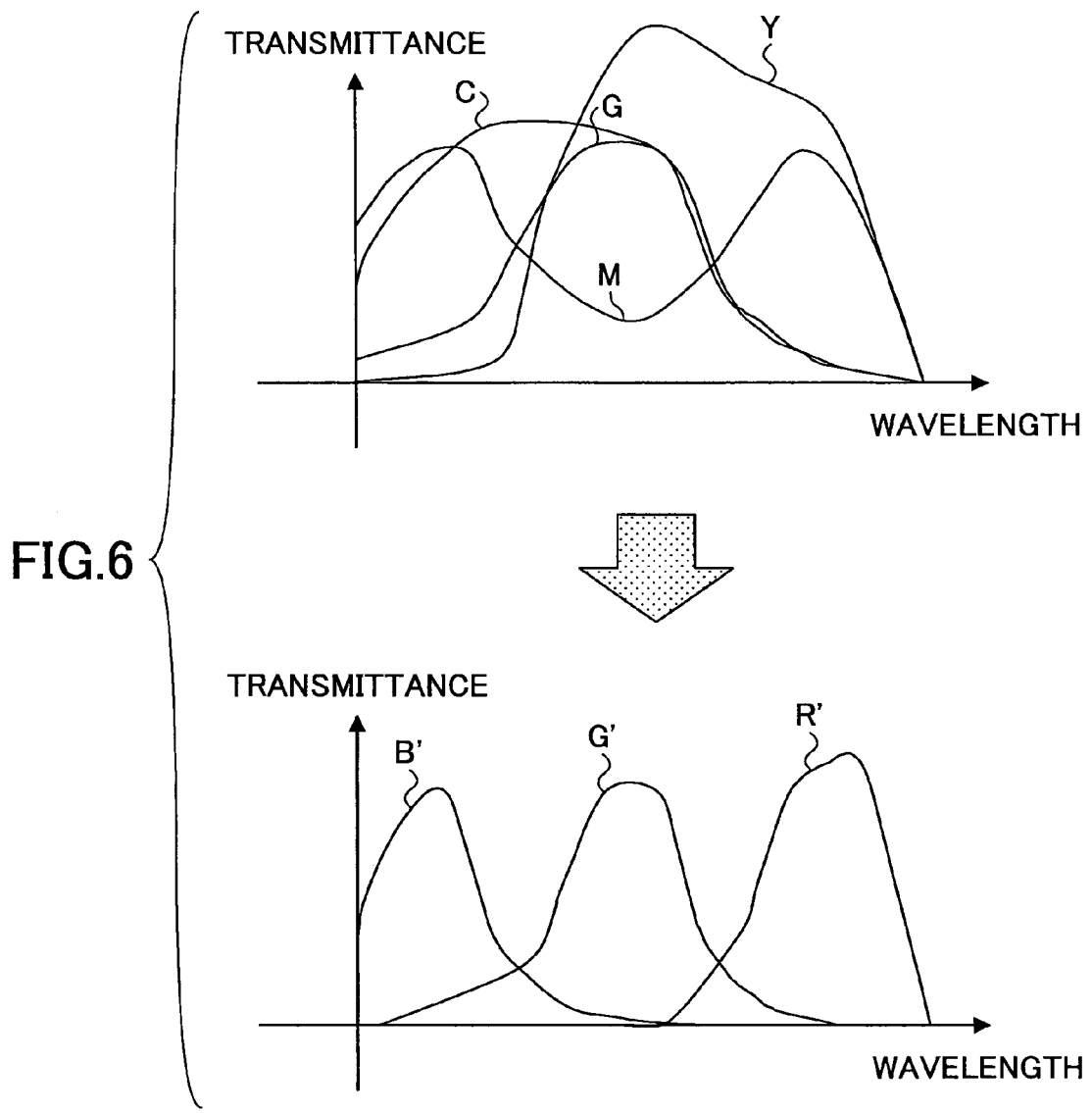
FIG. 6 is a drawing illustrating exemplary wavelength conversion according to the second embodiment.

The wavelength conversion unit 210 performs calculations similar to those performed by the wavelength conversion unit 110 of FIG. 1 to equivalently change the spectral characteristics of the complementary color filters such that the transmission range of each color becomes smaller as shown in FIG. 6.

The configuration of FIG. 5 makes it possible to effectively correct the chromatic aberration of magnification even when an imaging device employing complementary color filters is used.

Figure 7:
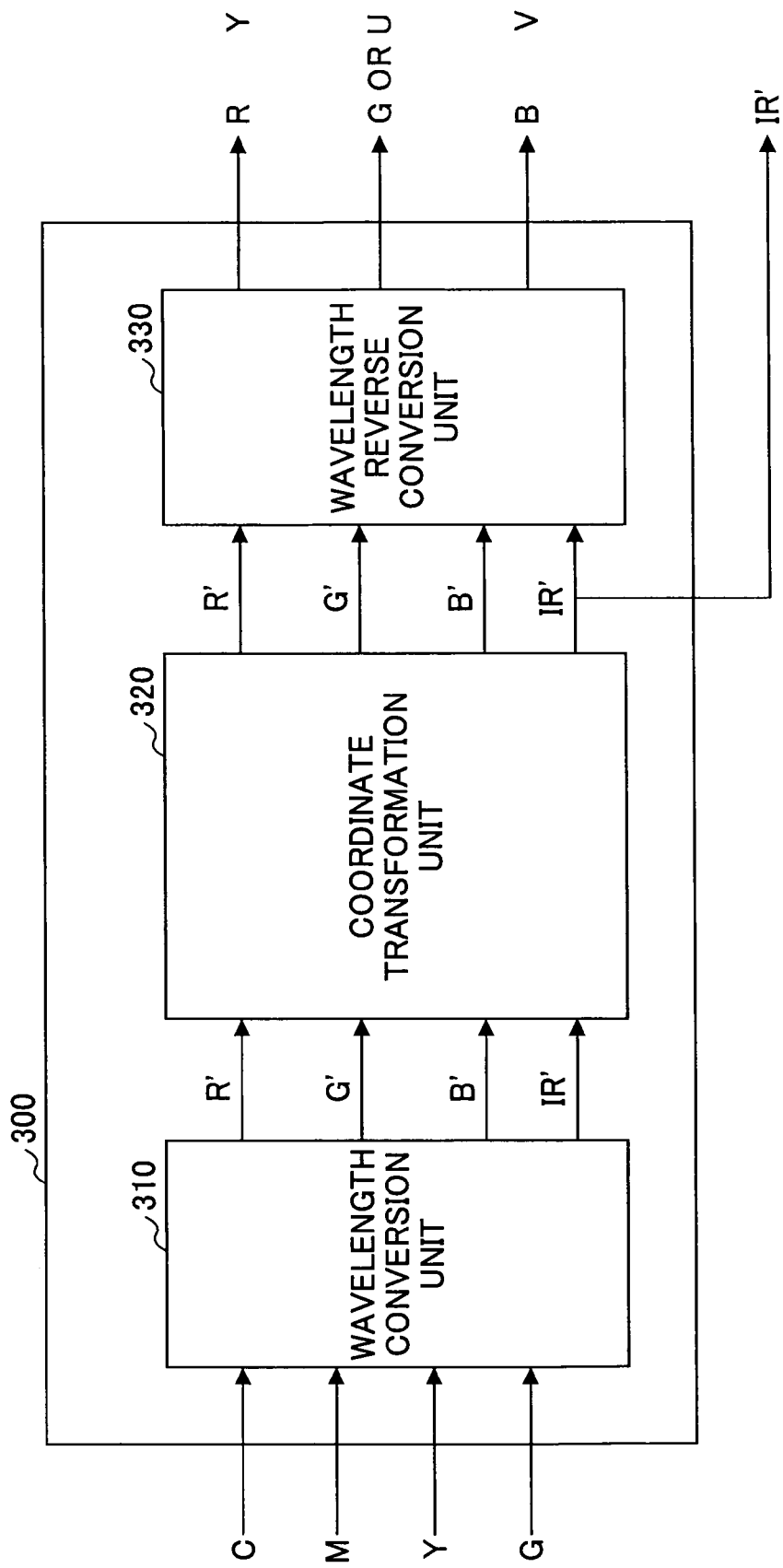
FIG. 7 is a drawing illustrating a chromatic-aberration-of-magnification correcting unit according to a third embodiment of the present invention.

FIG. 7 is a drawing illustrating a chromatic-aberration-of-magnification correcting unit 300 according to a third embodiment of the present invention. Different from the second embodiment, the chromatic-aberration-of-magnification correcting unit 300 of the third embodiment is also capable of obtaining IR' data with an infrared wavelength band. In other words, the chromatic-aberration-of-magnification correcting unit 300 converts CMYG image data into wavelength data components including an infrared wavelength data component having an infrared wavelength band.

When a CMOS sensor, which is highly sensitive to infrared rays, is used, it is particularly preferable to correct the chromatic aberration of magnification after separating IR' data with an infrared wavelength band. Also, the obtained IR' data may be output separately from RGB image data and used, for example, for infrared sensing by a night-vision device.

Figure 8:
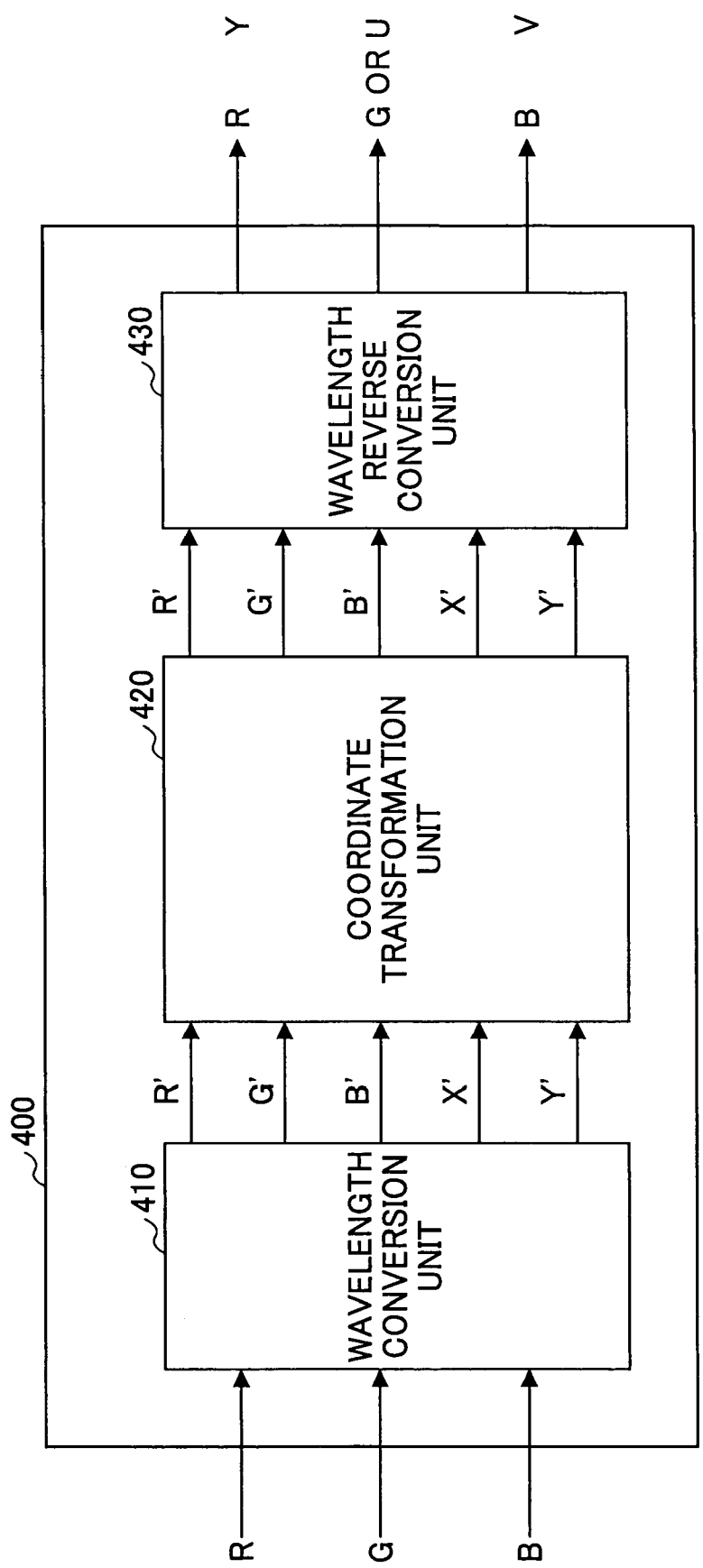
FIG. 8 is a drawing illustrating a chromatic-aberration-of-magnification correcting unit according to a fourth embodiment of the present invention.
Figure 9:
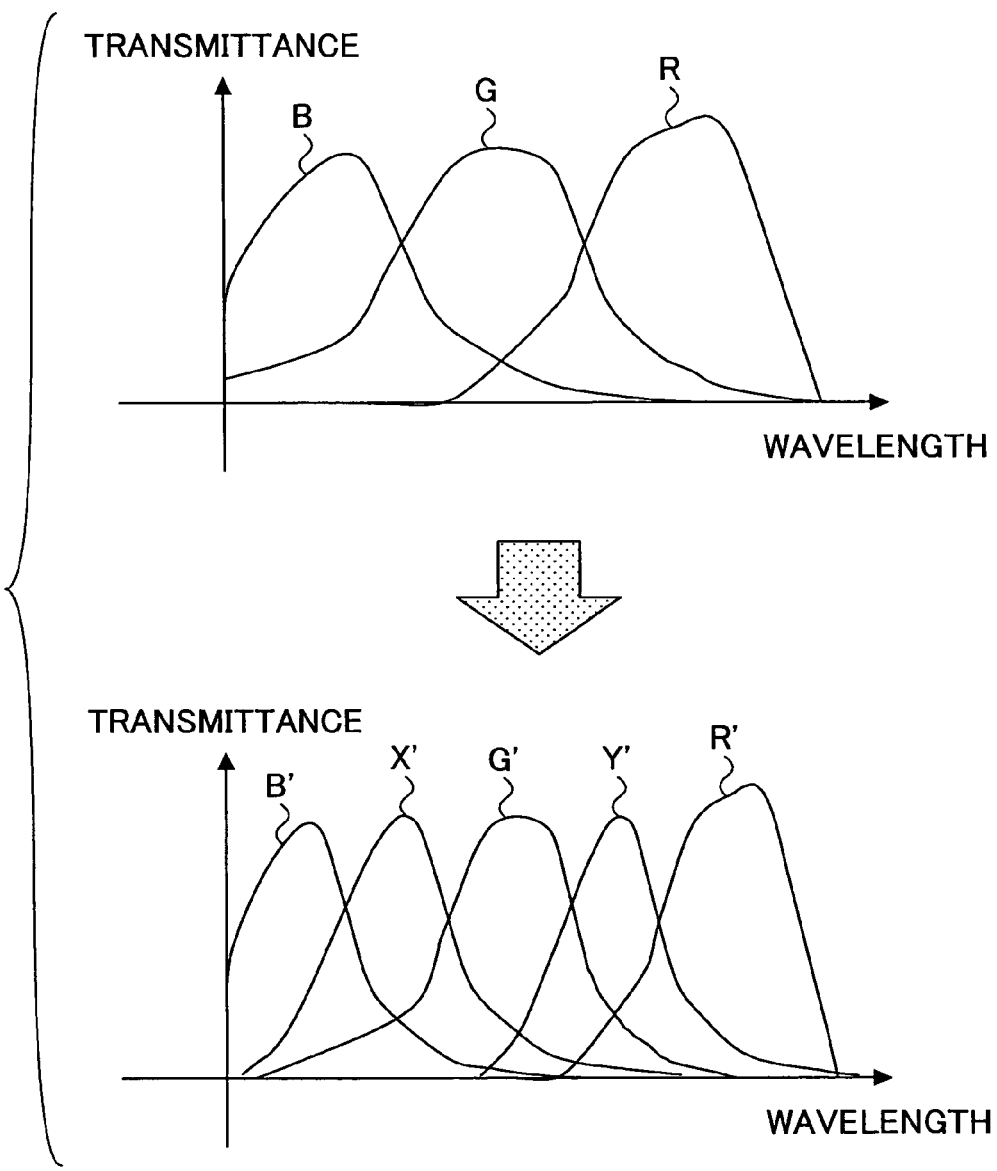
FIG. 9 is a drawing illustrating exemplary wavelength conversion according to the fourth embodiment.

FIG. 8 is a drawing illustrating a chromatic-aberration-of-magnification correcting unit 400 according to a fourth embodiment of the present invention. In this embodiment, the chromatic aberration of magnification is corrected after dividing (or converting) image data into wavelength data components the number of which is greater than the number of the colors of color filters of the imaging device. In FIG. 8, it is assumed that RGB color filters are used for the imaging device as in FIG. 1 and obtained RGB image data are divided into R', G', B', X', and Y' wavelength data components before the chromatic aberration of magnification is corrected. FIG. 9 shows relationships between RGB wavelengths and R'G'B'X'Y' wavelengths.

The configuration of FIG. 8, although it slightly increases a circuit size, makes it possible to accurately correct the chromatic aberration of magnification. Similarly, when complementary color (CMYG) filters are used for the imaging device, obtained CMYG data may be divided into wavelength data components, the number of which is greater than the number of the colors of the complementary color filters, before the chromatic aberration of magnification is corrected.

Next, an exemplary configuration of a coordinate transformation unit is described. Although the coordinate transformation unit 120 of the first embodiment is taken as an example in the descriptions below, the descriptions may also apply to the coordinate transformation units of other embodiments.

In the related art, chromatic aberration of magnification is normally corrected by performing coordinate transformation separately on each of the color components of RGB image data. In this embodiment, coordinate transformation is performed on R'G'B' data obtained by performing color space conversion on RGB image data. For example, as described later, chromatic aberration of magnification is corrected by performing coordinate transformation on the R' and B' components and thereby copying the R' and B' components onto the position of the G' component. This configuration makes it possible to reduce the size of a circuit used to correct the chromatic aberration of magnification.

Figure 10:
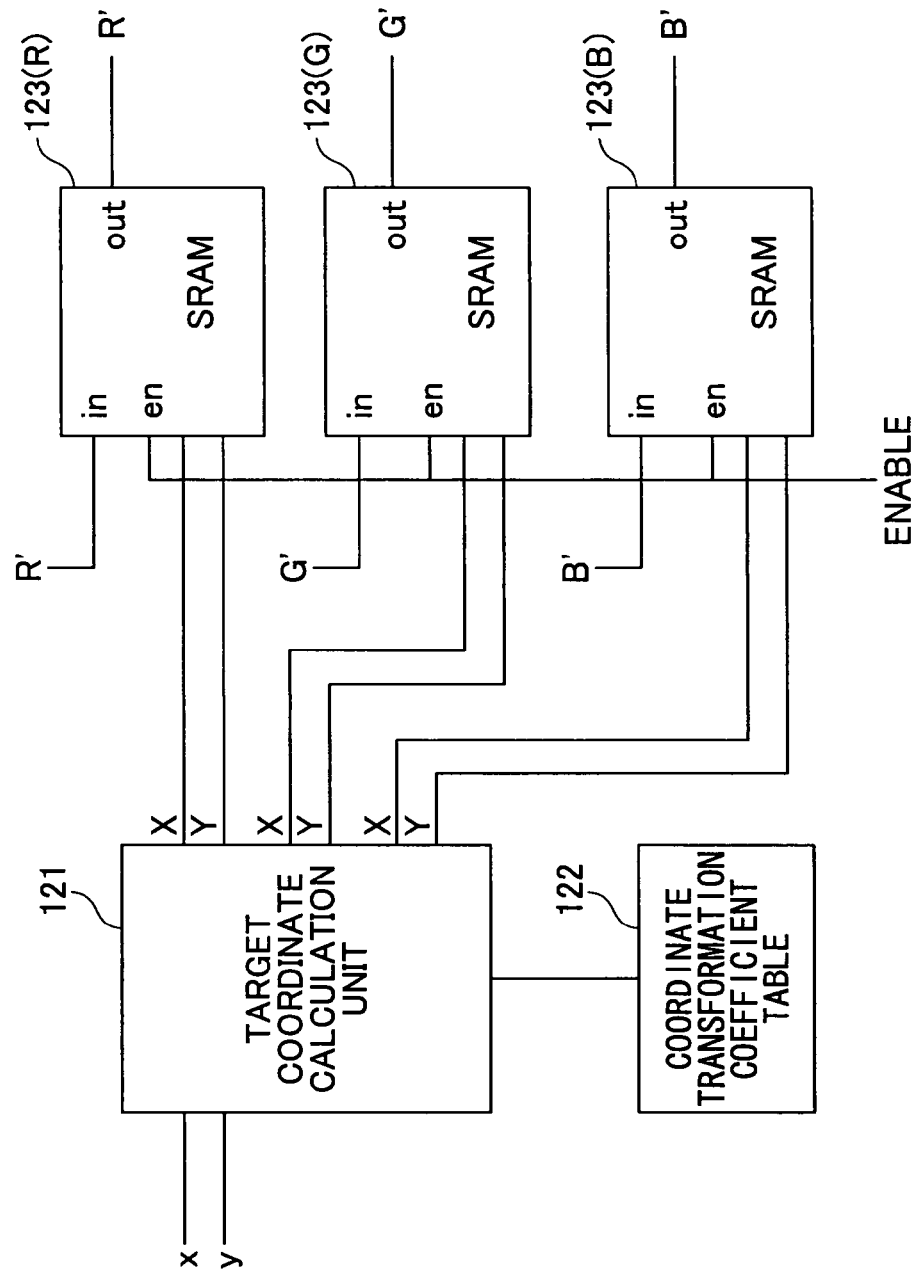
FIG. 10 is a drawing illustrating an exemplary configuration of a coordinate transformation unit shown in FIG. 1.

FIG. 10 is a drawing illustrating an exemplary configuration of the coordinate transformation unit 120. As shown in FIG. 10, the coordinate transformation unit 120 includes a target coordinate calculation unit 121 that calculates target coordinates for correcting the chromatic aberration of magnification for each of the R'G'B' components according to predetermined coordinate transformation formulas; and a coordinate transformation coefficient table 122 containing coefficients used in the coordinate transformation formulas. The coordinate transformation unit 120 also includes coordinate transformation memories (line buffers) 123(R), 123(G), and 123(B) corresponding to the R'G'B' components.

As the line buffers used in a process of correcting chromatic aberration of magnification, low-capacity three-port memories or low-capacity low latency memories are preferably used. In this example, it is assumed that the maximum chromatic aberration of magnification is 20 lines in the Y direction and each of the coordinate transformation memories 123(R), 123(G), and 123(B) is implemented by an SRAM having a capacity of 20 lines. The size of an image in the X direction is determined by its resolution. For example, when the resolution of an image is VGA (640×480), the size of the image in the X direction is 640 dots. The color depth of each of the RGB color components is assumed to be 8 bits. Data are written into and read from each of the coordinate transformation memories 123(R), 123(G), and 123(B) by 8 bits.

Thus, in this embodiment, each of the coordinate transformation memories (line buffers) 123(R), 123(G), and 123(B) is implemented by a low-capacity three-port SRAM provided in an image processing chip and having a memory area for 20 lines of data. Alternatively, a one-port low-latency memory, such as an SRAM, may be used as a three-port memory by time sharing for the above purpose.

The R'G'B' wavelength data components obtained by performing color space conversion on the RGB image data are written into the corresponding coordinate transformation memories 123(R), 123(G), and 123(B) in sequence from the first line according to the coordinates (x, y). When 20 lines of data are written into each of the memories, the written data are output in sequence from the first line and subsequent lines of data are written into the respective memories. Thus, 20 lines of the R'G'B' wavelength data components necessary for coordinate transformation are repeatedly stored in the corresponding coordinate transformation memories 123(R), 123 (G), and 123(B).

The coordinates (x, y) indicate the readout position of one frame of the obtained image. Meanwhile, each of the coordinate transformation memories 123(R), 123(G), and 123(B) is a line buffer having a capacity of 20 lines and its write line changes cyclically. Accordingly, the coordinates (x, y) cannot be used as the write addresses of the coordinate transformation memories 123(R), 123(G), and 123(B) without change.

Therefore, it is necessary to translate the coordinates (x, y) into the real addresses of the coordinate transformation memories 123(R), 123(G), and 123(B). Configurations for this process are omitted in FIG. 10. Similarly, it is necessary to translate the read addresses of the coordinate transformation memories 123(R), 123(G), and 123(B) into coordinates (X, Y) in a reading process described later.

The target coordinate calculation unit 121 receives original coordinates (x, y) and calculates and outputs target coordinates (X, Y) for correcting chromatic aberration of magnification using predetermined coordinate transformation formulas (e.g., polynomials) for each of the R'G'B' components. In this embodiment, coordinate transformation is performed on the R' and B' components to copy the R' and B' components onto the position of the G' component. Therefore, the target coordinate calculation unit 121 outputs the coordinates (x, y) of the G' component as coordinates (X, Y) without change. Meanwhile, the target coordinate calculation unit 121 converts the coordinates (x, y) of the R' and B' components and outputs the converted coordinates as coordinates (X, Y). The target coordinate calculation unit 121 repeats this process for all sets of coordinates (x, y).

When the center of the screen is the origin of the coordinate system, the coordinate transformation formulas are, for example, expressed as follows:

$$X=x+[a(1)+a(2)\times abs(x)+a(3)\times abs(y)+a(4)\times y^2]\times x$$

$$Y=y+[b(1)+b(2)\times abs(y)+b(3)\times abs(x)+b(4)\times x^2]\times y \quad (4)$$

In the above formulas, abs ( ) indicates an absolute value and a(1) through a(4) and b(1) through b(4) indicate coordinate transformation coefficients. The coordinate transformation coefficients are stored beforehand in the coordinate transformation coefficient table 122.

In parallel with the writing process described above (to be precise, after a certain delay), the R'G'B' data are read in sequence from the respective coordinate transformation memories 123(R), 123(G), and 123(B) based on the coordinates (X, Y) (to be precise, addresses obtained by translating the coordinates (X, Y)) output from the target coordinate calculation unit 121. The G' component read from the coordinate transformation memory 123(G) has the same coordinates as those before the G' component is written into the memory. Meanwhile, the R' and B' components read from the coordinate transformation memories 123(R) and 123(B) have coordinates that are shifted from the original coordinates by the amount of chromatic aberration of magnification.

With the above process, the chromatic aberration of magnification of the R'G'B' data are corrected and the corrected R'G'B' data are output from the coordinate transformation memories 123(R), 123(G), and 123(B). In other words, R'G'B' data with original coordinates (x, y) are converted into R'G'B' data with target coordinates (X, Y).

Figure 11B:
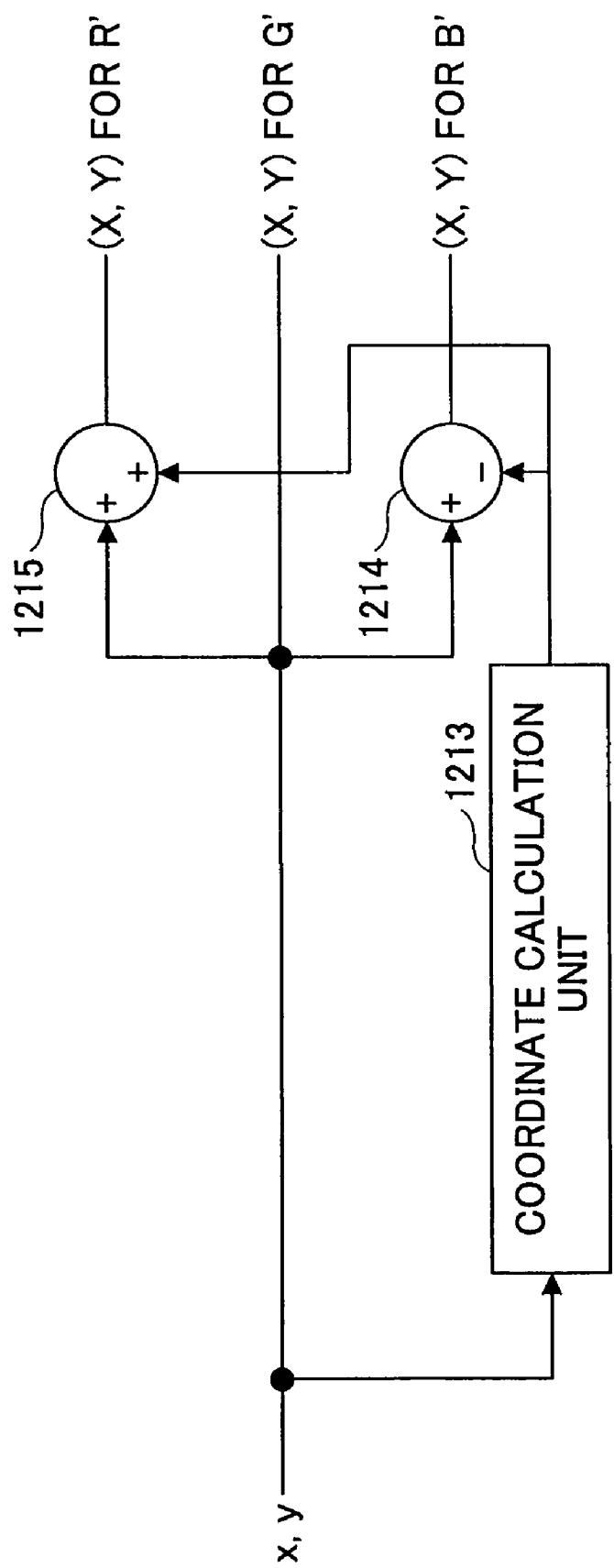

FIGS. 11A through 11C are drawings illustrating exemplary configurations of the target coordinate calculation unit 121. With the configuration of FIG. 11A, the coordinates (x, y) of the G' component are not converted and are output without change as coordinates G' (X, Y). Meanwhile, the coordinates (x, y) of the R' and B' components are converted by coordinate calculation units 1211 and 1212 and the converted coordinates are output as coordinates R' (X, Y) and coordinates B' (X, Y). This configuration makes it possible to reduce the circuit size since coordinate calculation units are necessary only for the R' and B' components.

Configurations of FIGS. 11B and 11C are based on an assumption that the chromatic aberration of magnification generally causes the R and B color components to symmetrically shift about the G color component. With the configuration of FIG. 11B, a coordinate calculation unit 1213 obtains correction values for the coordinates (x, y), a subtractor 1214 outputs coordinates B' (X, Y) by subtracting the correction values from the coordinates (x, y), and an adder 1215 outputs coordinates R' (X, Y) by adding the correction values to the coordinates (x, y). Also, similar to FIG. 11A, the coordinates (x, y) of the G' component are output without change as coordinates G' (X, Y).

The configuration of FIG. 11C further includes a gain circuit 1216 that adjusts the correction values for the R' component taking into account a difference in symmetry. Alternatively, the gain circuit 1216 may be provided for the B' component. The configurations of FIGS. 11B and 11C require only one coordinate calculation unit and therefore make it possible to further reduce the circuit size.

The coordinate calculation units 1211 and 1212 shown in FIG. 11A may be replaced with a lookup table (LUT) defining the correspondence between input coordinates (x, y) and output coordinates (X, Y) for the respective R and B color components. In this case, target coordinates (X, Y) for original coordinates (x, y) are obtained based on the LUT. Similarly, the coordinate calculation unit 1231 in FIGS. 11B and 11C may be replaced with an LUT defining the correspondence between input coordinates (x, y) and correction values, and correction values for coordinates (x, y) may be obtained based on the LUT. Using an LUT eliminates the need to perform calculations for coordinate transformation and makes it possible to correct the chromatic aberration of magnification using basically memory chips only.

Figure 12:
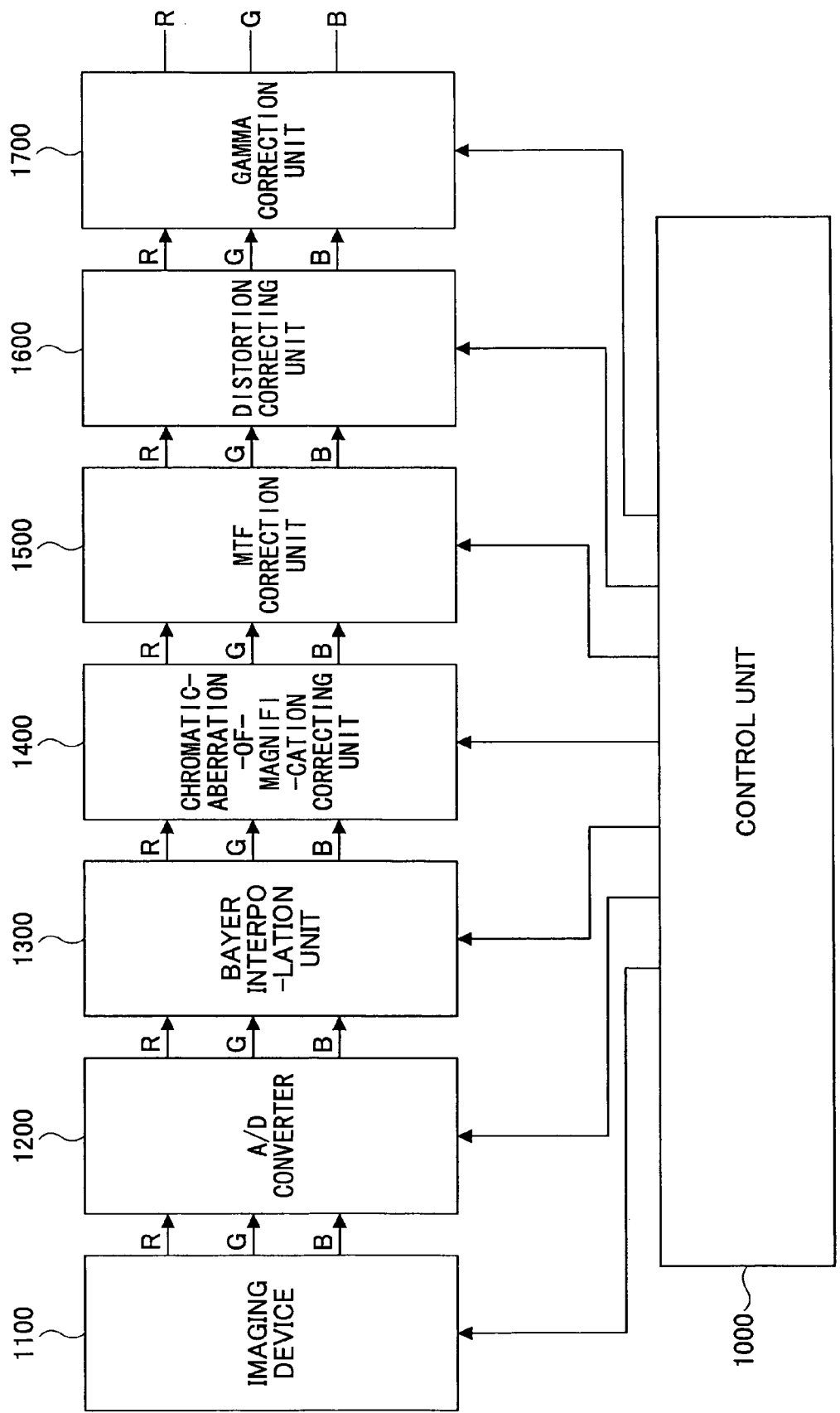
FIG. 12 is a block diagram illustrating an imaging apparatus according to an embodiment of the present invention.

FIG. 12 is a block diagram illustrating an imaging apparatus according to an embodiment of the present invention. In addition to processing components shown in FIG. 12, the imaging apparatus may include an operations unit, an image storing unit, and an image display unit (monitor). Applications of the imaging apparatus include, but are not limited to, an on-vehicle camera. In this embodiment, it is assumed that the imaging apparatus uses a wide-angle optical system having chromatic aberration of magnification and distortion to capture an image of an object and includes an image processing system for correcting the distortion in addition to the chromatic aberration of magnification. However, this embodiment may also be applied to a case where the imaging apparatus uses a wide-angle optical system having at least chromatic aberration of magnification to capture an image and includes an image processing system for correcting the chromatic aberration of magnification. It is also assumed that an imaging device of the imaging apparatus uses additive color filters, i.e., RGB filters, and image data include red (R), green (G), and blue (B) color components. Alternatively, the imaging device may use complementary color filters and image data may include yellow (Y), magenta (M), and cyan (C) color components.

As shown in FIG. 12, a control unit 1000 sends control signals (clock signal, horizontal/vertical synchronizing signal, and so on) to other processing components of the imaging apparatus and thereby controls the processing components by pipelining.

An imaging device 1100 includes a CCD or a CMOS sensor for converting an optical image input from a wide-angle optical system (not shown) having chromatic aberration of magnification and distortion into an electric signal (image data). The imaging device 1100 also includes a Bayer color filter array and outputs RGB image data with a Bayer arrangement based on coordinates (x, y) given by the control unit 1000. The control unit 1000 provides the coordinates (x, y) also to processing components downstream of the imaging device 110 after a delay. Alternatively, the coordinates (x, y) may be generated by the imaging device 1100 based on clock and horizontal/vertical synchronizing signals and provided to downstream processing components from the imaging device 1100.

An A/D converter 1200 converts the analog RGB image data with the Bayer arrangement output from the imaging device 1100 into a digital signal and sends the digital signal to a Bayer interpolation unit 1300. Each of the RGB color components of the digital signal is represented, for example, by 8 bits. Although an AGC circuit is normally provided upstream of the A/D converter 1200, it is omitted in FIG. 12.

The Bayer interpolation unit 1300 receives the digitized RGB image data with the Bayer arrangement, generates image data for all coordinate positions by linear interpolation separately for each of the RGB color components, and sends the generated image data to a chromatic-aberration-of-magnification correcting unit 1400.

FIG. 13 shows a Bayer color filter array. In FIG. 13; $G_0$ is obtained by the following formula (5):

$$G0=(G2+G4+G6+G8)/4 \tag{5}$$

$R_2$, $R_4$, $R_6$, $R_8$, and $R_0$ are obtained by the following formulas (6) through (10):

$$R_2=(R_1+R_3)/2 \tag{6}$$

$$R_4=(R_3+R_5)/2 \tag{7}$$

$$R_6=(R_5+R_7)/2 \tag{8}$$

$$R_8=(R_1+R_7)/2 \tag{9}$$

$$R_0=(R_1+R_3+R_5+R_7)/4 \tag{10}$$

$B_2$, $B_4$, $B_6$, $B_8$, and $B_0$ are obtained in substantially the same manner as $R_2$, $R_4$, $R_6$, $R_8$, and $R_0$, and therefore formulas for obtaining $B_2$, $B_4$, $B_6$, $B_8$, and $B_0$ are omitted here.

In this embodiment, it is assumed that the imaging device 1100 includes RGB color filters with a Bayer arrangement. However, this embodiment may also be applied to an imaging device including a different type of color filters such as CMYG color filters or RGB+Ir(infrared) color filters. Compared with an imaging device including three-color (e.g., RGB) color filters, an imaging device including four-color color filters requires memories with lower latency or four-port RAMs to correct chromatic aberration of magnification.

The chromatic-aberration-of-magnification correcting unit 1400 receives the linearly interpolated RGB image data, performs coordinate transformation separately on each of the RGB color components based on predetermined polynomials to correct chromatic aberration of magnification of the RGB image data, and outputs the chromatic-aberration-of-magnification-corrected RGB image data. The chromatic-aberration-of-magnification correcting unit 1400 corresponds to the chromatic-aberration-of-magnification correcting unit 100 of FIG. 1. The chromatic-aberration-of-magnification correcting unit 1400 converts input RGB image data into R'G'B' data having wavelength bands different from those of the color filters of the imaging device 1100, converts coordinates of the R'G'B' data to correct the chromatic aberration of magnification, converts the coordinate-converted R'G'B' data into RGB data having the original wavelength bands of the color filters, and outputs the RGB data. This configuration makes it possible to improve the quality of even a peripheral part of an image where the chromatic aberration of magnification is large. The chromatic-aberration-of-magnification correcting unit 1400 is preferably configured to perform coordinate transformation only on the R' and B' components. This makes it possible to reduce the circuit size. For the coordinate transformation for correcting the chromatic aberration of magnification, low-capacity, low-latency memories or low-capacity, multi-port memories (e.g., SRAM) are preferably used.

An MTF correction unit 1500 receives the chromatic-aberration-of-magnification-corrected RGB image data, corrects the MTF of its luminance signal using an FIR filter, and outputs the MTF-corrected RGB image data.

Figure 14:
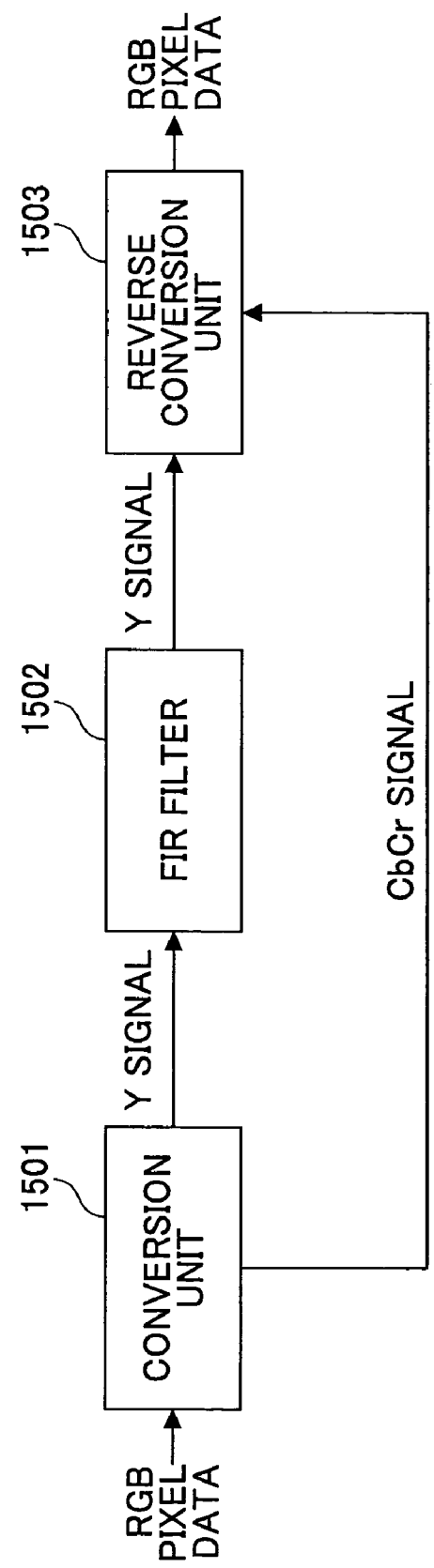
FIG. 14 is a drawing illustrating an exemplary configuration of an MTF correction unit shown in FIG. 12.

FIG. 14 is a drawing illustrating an exemplary configuration of the MTF correction unit 1500. A conversion unit 1501 converts RGB pixel data into YCbCr pixel data using the following formulas (11) through (13):

$$Y=0.299R+0.587G+0.114B \tag{11}$$

$$Cr=0.500R-0.419G-0.081B \tag{12}$$

$$Cb=-0.169R-0.332G+0.500B \tag{13}$$

An FIR filter (5×5 filter) 1502 receives only the luminance signal Y (Y signal) of the YCbCr signals and corrects the MTF of the Y signal. Filtering only the Y signal (performing MTF correction only on the Y signal) makes it possible to improve the image quality while suppressing the increase in color noise. FIG. 15 shows coefficients of an exemplary FIR filter. Since the Y signal is filtered, MTF correction is preferably performed after correcting the chromatic aberration of magnification. Meanwhile, as described later, in coordinate transformation for correcting the distortion, the distances between original coordinates and target coordinates are generally large and therefore calculation errors tend to occur. If MTF correction is performed after the coordinate transformation for correcting the distortion, the calculation errors are multiplied by the MTF correction and the image quality may be reduced. To prevent this problem, the MTF correction unit 1500 is preferably provided downstream of the chromatic-aberration-of-magnification correcting unit 1400 and upstream of a distortion correcting unit 1600.

A reverse conversion unit 1503 receives the CbCr signals and the MTF-corrected Y signal and converts the signals back into RGB pixel data using the following formulas (14) through (16):

$$R=Y+1.402Cr \tag{14}$$

$$G=Y-0.714Cr-0.344Cb \tag{15}$$

$$B=Y+1.772Cb \tag{16}$$

The distortion correcting unit 1600 receives the RGB image data of which the chromatic aberration of magnification and MTF are corrected, performs coordinate transformation collectively on the RGB color components using predetermined formulas (e.g., polynomials) to correct distortion of the RGB image data, and outputs the distortion-corrected RGB image data. A memory used for the coordinate transformation for correcting the distortion requires a capacity (up to one screen of data) higher than that of a memory used for correcting the chromatic aberration of magnification but requires only one port. Therefore, a high-latency memory (such as a DRAM) may be used for this purpose.

Figure 16:
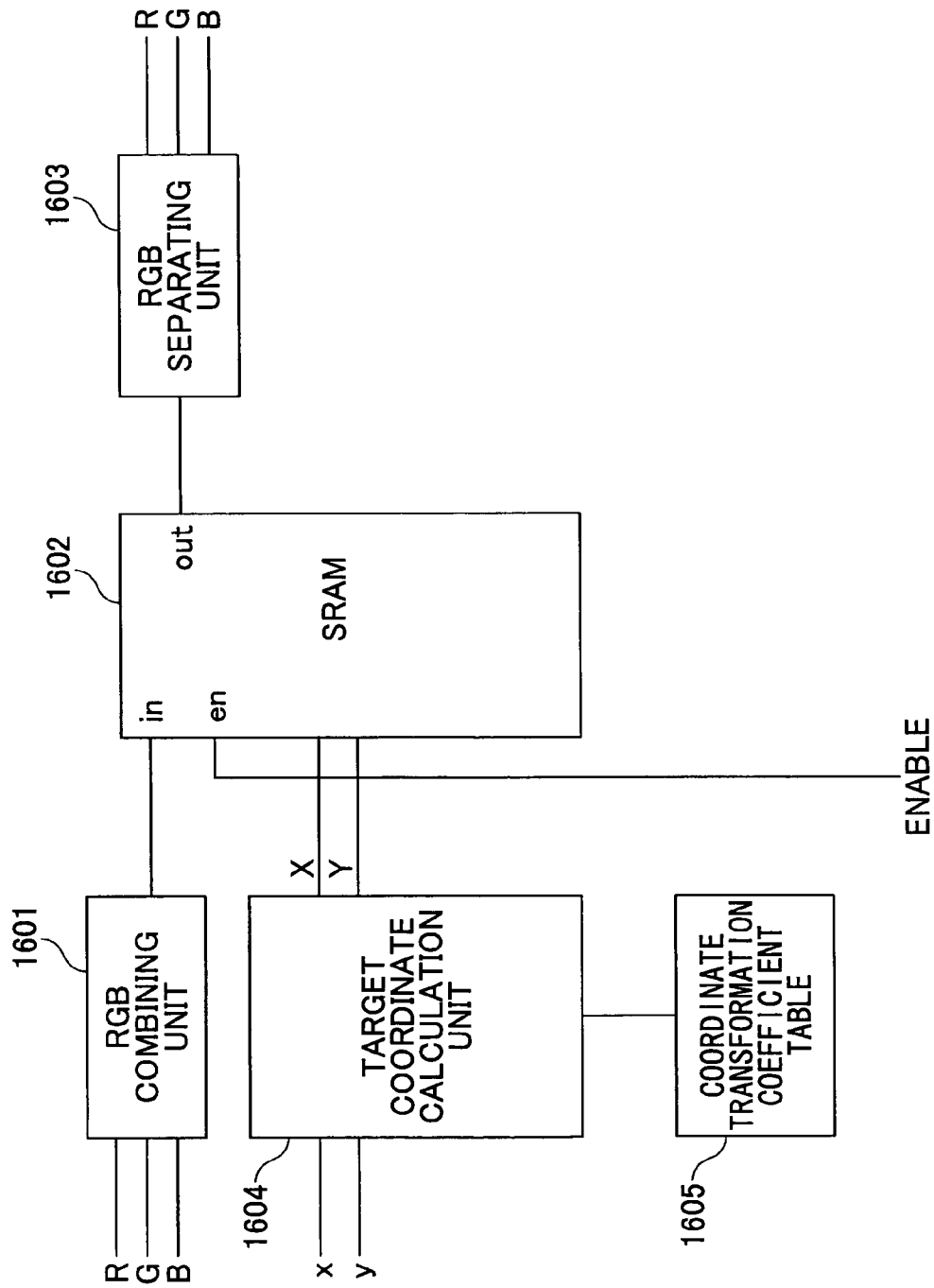
FIG. 16 is a drawing illustrating an exemplary configuration of a distortion correcting unit shown in FIG. 12.
Figure 17:
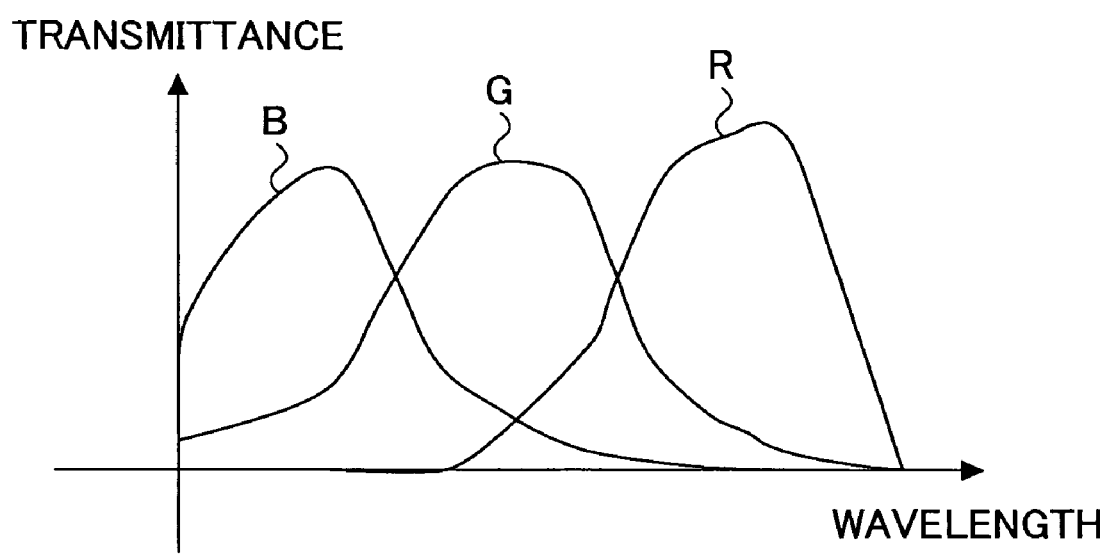
FIG. 17 is a graph showing exemplary spectral characteristics of color filters.

FIG. 16 is a drawing illustrating an exemplary configuration of the distortion correcting unit 1600. The distortion correcting unit 1600 includes an RGB combining unit 1601 that combines RGB color components and outputs combined RGB image data, a coordinate transformation memory 1602 for storing the combined RGB image data, an RGB separating unit 1603 for separating the combined RGB image data back into RGB color components, a target coordinate calculation unit 1604 for calculating target coordinates for correcting distortion according to predetermined coordinate transformation formulas, and a coordinate transformation coefficient table 1605 containing coefficients used in the coordinate transformation formulas.

Since the amounts of shift of pixels caused by distortion are generally large, a buffer memory capable of storing up to one screen of image data is necessary for the distortion correcting process. Meanwhile, since distortion shifts the RGB color components substantially uniformly, the distortion correcting process requires only one buffer memory having a bit width corresponding to the total bit width of the RGB image data. Here, it is assumed that the resolution of an image is VGA (640×480), the number of bits (color depth) of each of the RGB color components is 8 bits, and the coordinate transformation memory 1602 is implemented by a DRAM capable of storing 640×480 dots and inputting/outputting data by 24 bits.

Since the coordinate transformation memory 1602 requires a very large capacity, it is not cost-efficient to provide an SRAM as the memory 1602 in an image processing chip. Therefore, it is preferable to implement the coordinate transformation memory 1602 by a one-port DRAM provided outside of an image processing chip.

The RGB combining unit 1601 inputs, each time, 8 bits of each of the RGB color components of the chromatic-aberration-of-magnification-corrected RGB image data, combines the RGB color components to form combined RGB image data (24 bits), and outputs the combined RGB image data. The combined RGB image data are written into the coordinate transformation memory 1602 in sequence from the first line according to the original coordinates (x, y).

The target coordinate calculation unit 1604 receives original coordinates (x, y) and calculates target coordinates (X, Y) for correcting distortion based on predetermined coordinate transformation formulas (e.g., polynomials) collectively for the combined RGB image data. The coordinate transformation formulas are substantially the same as formulas (4) used for correcting the chromatic aberration of magnification except that different coordinate transformation coefficients are used. The coordinate transformation coefficients are stored beforehand in the coordinate transformation coefficient table 1605.

In parallel with the writing process of the combined RGB image data (24 bits) (to be precise, after a certain delay), the combined RGB data are read in sequence from the coordinate transformation memory 1602 based on the coordinates (X, Y) output from the target coordinate calculation unit 1604. The RGB separating unit 1603 separates the combined RGB image data (24 bits) read from the coordinate transformation memory 1602 back into the RGB color components (each having a size of 8 bits).

Thus, the RGB separating unit 1603 outputs distortion-corrected RGB color components of the image data. In other words, the RGB color components are copied onto original coordinates (x, y).

Also in the distortion correction process, target coordinates (X, Y) for original coordinates (x, y) may be obtained using a lookup table (LUT) defining the correspondence between input coordinates (x, y) and output coordinates (X, Y). Using an LUT eliminates the need to perform calculations for coordinate transformation and makes it possible to correct the distortion using basically a memory chip only.

Referring back to FIG. 12, a gamma correction unit 1700 receives the RGB image data from the distortion correcting unit 1600, performs gamma correction on the RGB image data using, for example, look-up tables provided for the respective RGB color components, and outputs the gamma-corrected RGB image data. The gamma-corrected RGB image data output from the gamma correction unit 1700 are displayed on a display unit (not shown).

The configuration of FIG. 12 makes it possible to provide a compact and low-cost imaging apparatus that can provide a high-quality image even when an optical system having chromatic aberration of magnification and distortion is used.

Embodiments of the present invention make it possible to effectively correct chromatic aberration of magnification in an imaging apparatus including a wide-angle optical system having chromatic aberration of magnification and an imaging device having color filters.

The present invention is not limited to the specifically disclosed embodiments, and variations and modifications may be made without departing from the scope of the present invention.

The present application is based on Japanese Priority Application No. 2008-069506, filed on Mar. 18, 2008, the entire contents of which are hereby incorporated herein by reference.

What is claimed is:

1. An imaging apparatus, comprising:
   a wide-angle optical system having at least chromatic aberration of magnification;
   an imaging device including color filters and configured to receive an optical image from the optical system via the color filters and to convert the optical image into image data; and
   a chromatic aberration of magnification correcting unit configured to convert coordinates of the image data and thereby correct chromatic aberration of magnification of the image data,
   wherein the chromatic aberration of magnification correcting unit is configured to convert the image data into different-wavelength image data having wavelength bands that are narrower than original wavelength bands of the color filters before correcting the chromatic aberration of magnification, and
   wherein the chromatic aberration of magnification correcting unit is configured to convert the different-wavelength image data into original-wavelength image data having the original wavelength bands of the color filters after correcting the chromatic aberration of magnification.

2. The imaging apparatus as claimed in claim 1, wherein the color filters of the imaging device are additive color filters.

3. The imaging apparatus as claimed in claim 1, wherein the color filters of the imaging device are complementary color filters.

4. An imaging apparatus, comprising:
   a wide-angle optical system having at least chromatic aberration of magnification;
   an imaging device including color filters and configured to receive an optical image from the optical system via the color filters and to convert the optical image into image data; and
   a chromatic aberration of magnification correcting unit configured to convert coordinates of the image data and thereby correct chromatic aberration of magnification of the image data,
   wherein the chromatic aberration of magnification correcting unit is configured to convert the image data into different-wavelength image data having wavelength bands that are narrower than original wavelength bands of the color filters before correcting the chromatic aberration of magnification,
   wherein the chromatic aberration of magnification correcting unit is configured to convert the image data into wavelength data components before correcting the chromatic aberration of magnification, a number of the wavelength data components being greater than a number of colors of the imaging device.

5. The imaging apparatus as claimed in claim 1, wherein the chromatic aberration of magnification correcting unit is configured to convert the image data into wavelength data components including an infrared wavelength data component before correcting the chromatic aberration of magnification.

6. The imaging apparatus as claimed in claim 1, wherein the chromatic aberration of magnification correcting unit is configured to convert only a portion of the image data corresponding to a peripheral part of the optical image into the different-wavelength image data having wavelength bands different from the original wavelength bands of the color filters.

7. The imaging apparatus as claimed in claim 1, wherein the chromatic aberration of magnification correcting unit is configured not to correct the chromatic aberration of magnification of saturated pixels output from the imaging device.

8. The imaging apparatus as claimed in claim 1, wherein the chromatic aberration of magnification correcting unit is configured not to convert saturated pixels output from the imaging device into the different-wavelength image data having wavelength bands different from the original wavelength bands of the color filters.

9. The imaging apparatus as claimed in claim 1, wherein the chromatic aberration of magnification correcting unit is configured to not convert coordinates of a specific color component of the image data and to convert coordinates of color components other than the specific color component of the image data.

10. The imaging apparatus as claimed in claim 9, wherein the chromatic aberration of magnification correcting unit is configured to obtain correction values based on the coordinates of the specific color component of the image data and to convert the coordinates of the color components other than the specific color component based on the correction values.

11. The imaging apparatus as claimed in claim 10, wherein the chromatic aberration of magnification correcting unit is configured to adjust the correction values by a gain circuit for one of the color components other than the specific color component.

12. The imaging apparatus as claimed in claim 1, further comprising:
a distortion correcting unit disposed downstream of the chromatic aberration of magnification correcting unit and configured to convert coordinates of the image data after the chromatic aberration of magnification is corrected and thereby to correct distortion of the image data.

13. An imaging apparatus, comprising:
a wide-angle optical system having at least chromatic aberration of magnification;
an imaging device including color filters and configured to receive an optical image from the optical system via the color filters and to convert the optical image into image data; and
a chromatic aberration of magnification correcting unit configured to convert coordinates of the image data and thereby correct chromatic aberration of magnification of the image data,
wherein the chromatic aberration of magnification correcting unit is configured to convert the image data into different-wavelength image data having wavelength bands that are narrower than original wavelength bands of the color filters before correcting the chromatic aberration of magnification,
wherein the chromatic aberration of magnification correcting unit performs calculations according to:

$$R'=e(1)*R+e(2)*G+e(3)*B;$$

$$G'=e(4)*R+e(5)*G+e(6)*B;$$

$$B'=e(7)*R+e(8)*G+e(9)*B;$$

where,
R is the red input image data,
G is the green input image data,
B is the Blue input image data,
e(x) are coefficients to change the wavelength bands of each color,
R' is the red output image data,
G' is the green output image data, and
B' is the blue output image data.

* * * * *